UNITED STATES PATENT OFFICE.

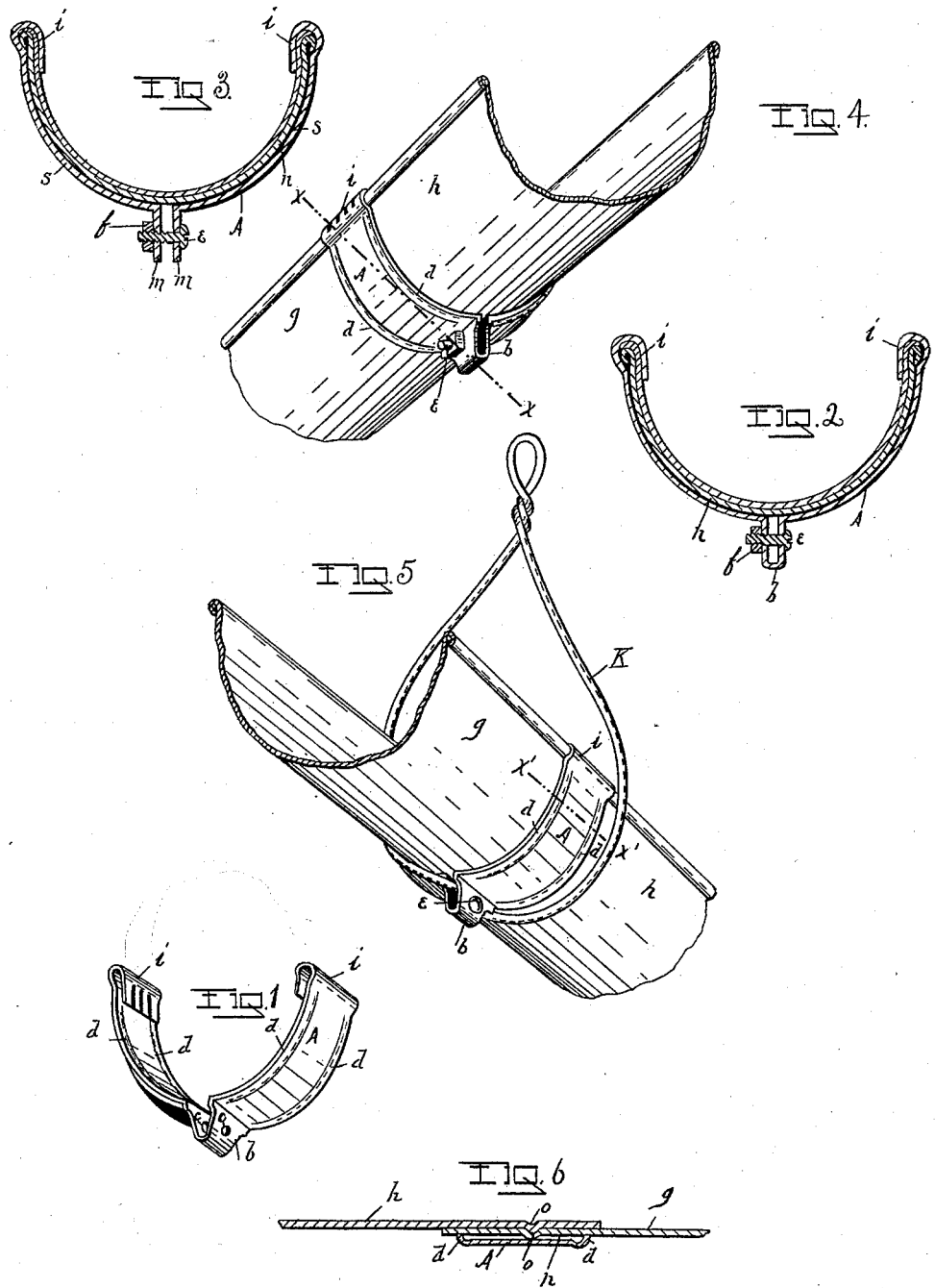

WILLIAM H. HAWKINS, OF SCHAGHTICOKE, NEW YORK.

GUTTER-SECTION FASTENER.

SPECIFICATION forming part of Letters Patent No. 426,446, dated April 29, 1890.

Application filed February 12, 1890. Serial No. 340,210. (No model.)

*To all whom it may concern:*

Be it known that I, WILLIAM H. HAWKINS, of Schaghticoke, in the county of Rensselaer and State of New York, have invented a certain new and useful Improvement in Gutter-Section Fasteners, of which the following description and claims constitute the specification, and which is illustrated by the accompanying sheet of drawings.

The object of my improvement is to facilitate the adjustment and tightening of gutter-section fasteners upon the lapped or otherwise united ends of the gutter-sections, to preserve the required shape of fasteners made of flexible metal, to allow of modifications being made in the shape of the ends of the gutter-secions without changing that of the fastener, to secure an air-space between the body of the fastener and the outer lapped gutter-section, to greatly increase the binding force of the fastener upon the gutter-sections united by it, and to utilize the fastener for holding in position a wire, by means of which the gutter may be suspended for use.

Figure 1 of the drawings is a perspective view of the improved gutter-section fastener. Fig. 2 is a cross-section through the gutter and fastener, taken on line $x\,x$ of Fig. 4. Fig. 3 is a modification of the fastener. Fig. 4 is a perspective view showing the fastener in position on the gutter. Fig. 5 is a perspective view showing reverse of Fig. 4, showing also manner of utilizing the fastener for holding a gutter-hanger in position on the gutter. Fig. 6 is a longitudinal section on line $x'\,x'$ of Fig. 5.

Similar letters refer to similar parts throughout the several views.

The gutter-section fastener A, Fig. 1, is made of flexible sheet metal. The loop $b$, Fig. 1, is formed in the fastener. The holes $c$, Fig. 1, are made in the loop. The side edges $d$ of the fastener A are bent upward from points near the ends $i$ of the fastener down to the loop $b$, Figs. 1 and 6. The loop $b$, through the holes $c$, Fig. 1, receives the bolt $e$, which receives the nut $f$, Figs. 2 and 3.

In constructing a gutter, the ends of the gutter-sections $g$ and $h$ being lapped together, those ends receive the fastener A, Figs. 2 and 4. The ends $i$ of the fastener are bent over and down upon the lapped ends of those sections, Figs. 1 and 2. The bolt $e$ is tightened in the nut $f$, Fig. 2. That operation tightens the fastener A in its position upon the sections $g$ and $h$, Figs. 4 and 5, and binds those sections more rigidly together than can be done by the single process of bending the ends $i$ of that fastener over the lapped edges of those sections. The bolt $e$, carrying the nut $f$, should be in position in the loop $b$, when the fastener A is first put upon the gutter, that the nut $f$ and head of the bolt $e$ may prevent the loop $b$ being opened too widely when the ends $i$ of that fastener are drawn over and bent down upon the edges of the sections $g$ and $h$, and after those sections have been firmly bound together the loop $b$ should still have sufficient spread to allow of the fastener A being further tightened upon those sections, if necessary, when the gutter is in use.

Bending the sides $d$ of the fastener A, as hereinbefore described, produces the following desirable results: It stiffens the fastener between its ends $i$ and loop $b$, thereby preserving its proper shape without impairing the flexibility of those ends and of the loop, decreases liability of the spreading of the gutter, allows of forming the ribs or creases $o$ in and across the ends of the sections $g$ and $h$, if desired, whereby uniformly strengthened laps are readily made, also secures the air-space $n$ between the body of the fastener and outer lapped section $g$, thereby preventing rust and decay, all as shown by Figs. 1 and 6.

Through the loop $b$, above or below the bolt $e$, Figs. 2 and 3, a wire may be inserted and bent around the gutter to form the hanger K, Fig. 5.

It is not necessary to make my improved fastener of one piece of metal carrying the bolt $e$ and nut $f$, as shown by Figs. 1 and 2. It may be formed of two pieces of metal S, carrying the bolt and the nut in the ends $m$ of those pieces, as shown by Fig. 3.

I disclaim in this application the subject-matter claimed in my application filed July 17, 1889, Serial No. 317,782, patented December 10, 1889, as No. 416,914.

What I claim is—

1. In a gutter-section fastener, the loop $b$;

carrying the bolt e and nut f, for the purpose set forth.

2. In a gutter-section fastener, the combination, with the ends i and loop b, of the bolt e and nut f, for the purpose set forth.

3. The combination, with the sections of metal forming a gutter, of the fastener A, having the loop b, operating with the bolt e, nut f, and ends i of the fastener to bind those sections and the fastener together and for holding the hanger K in position upon the gutter, and having the upwardly-turned edges d, operating with those sections to form the air-space n and to admit of downwardly-projecting creases o being formed in the ends of those sections, substantially as described.

4. As a new article of manufacture, the gutter-section fastener A, having the upwardly-turned edges d, and having the loop b, for holding in position the hanger K, and carrying the bolt e and nut f, for use with the loop and the ends i of the fastener in binding together the metallic sections forming the gutter, substantially as described.

WILLIAM H. HAWKINS.

Witnesses:
WILLIAM A. SWEET,
CLARENCE E. AKIN.